United States Patent [19]

Germain

[11] Patent Number: 5,428,972
[45] Date of Patent: Jul. 4, 1995

[54] FREEZING DEVICE WITH VIBRATING TROUGH

[75] Inventor: Jean-Pierre Germain, Montigny-le-Bretonneux, France

[73] Assignee: L'Air Liquide, Societe Anonyme pour l'Etude et l'Exploitation Des Procedes Georges Claude, Paris, France

[21] Appl. No.: 183,324

[22] Filed: Jan. 19, 1994

[30] Foreign Application Priority Data

Feb. 10, 1993 [FR] France .................. 93 01472

[51] Int. Cl.⁶ .................. F25D 13/06; F25D 17/02
[52] U.S. Cl. .................. 62/374; 62/63; 62/64; 62/378; 62/380; 198/752
[58] Field of Search .................. 62/63, 64, 373, 374, 62/378, 380; 198/752, 771

[56] References Cited

U.S. PATENT DOCUMENTS

| | | | |
|---|---|---|---|
| 3,789,711 | 2/1974 | Mead .................. | 198/752 X |
| 3,889,488 | 6/1975 | Maeda et al. .................. | 62/378 X |
| 4,062,202 | 12/1977 | Cloudy .................. | 62/380 |
| 4,068,029 | 1/1978 | Armstrong .................. | 198/771 X |
| 4,305,210 | 12/1981 | Christensen et al. .................. | 34/57 A |
| 4,377,937 | 3/1983 | Alquier et al. .................. | 62/374 |
| 4,951,472 | 8/1990 | Hansen et al. .................. | 62/63 |
| 5,156,008 | 10/1992 | Olsson et al. .................. | 62/63 |
| 5,299,426 | 4/1994 | Lermuzeaux .................. | 62/63 |

FOREIGN PATENT DOCUMENTS

| | | |
|---|---|---|
| 0115242 | 8/1984 | European Pat. Off. . |
| 2212521 | 7/1974 | France . |
| 2674320 | 9/1992 | France . |
| 847877 | 8/1952 | Germany . |

*Primary Examiner*—Christopher Kilner
*Attorney, Agent, or Firm*—Young & Thompson

[57] ABSTRACT

Device for freezing products, comprising a vibrating trough (2) comprising a bottom wall (3) on which the products (9) to be frozen move in contact with a layer of liquefied gas (7). The bottom wall (3) has a pattern of alternating projecting and hollow parts. The projecting parts are distributed in a regular pattern and are in continuous registry with the hollow parts. The height (h) of the projecting parts does not exceed half the thickness (e) of the layer of liquefied gas. The projecting parts have a constant height (h). The bottom wall (3) is an embossed metal sheet, preferably of stainless steel.

8 Claims, 1 Drawing Sheet

FREEZING DEVICE WITH VIBRATING TROUGH

FIELD OF THE INVENTION

The present invention relates to devices for freezing products, of the type comprising a vibrating trough comprising a bottom wall on which the frozen products move in contact with at least one layer of liquefied gas.

BACKGROUND OF THE INVENTION

Devices of this type are known from the document FR-A-2.212.521, in which the vibrating trough forms a trough containing a bath of liquefied gas, and FR-A-2.674.320, in which the products are placed in contact with a thin film of liquefied gas useful for most applications. In the known devices, the wall of the bottom of the vibrating trough is constituted by a smooth metallic sheet, which is supposed to promote the spreading of the liquid film and the sliding without hindrance of the products. The applicant has nevertheless found, that for products that do not have a very irregular external shape, and in particular for such products of transverse dimensions greater than 3 cm or substantially flat products, the extended contact between a substantially flat surface of the product and the smooth metal sheet at the bottom of the channel does not permit good circulation of the liquefied gas below the product and hence gives rise to noticeable gradients of freezing in this latter.

SUMMARY OF THE INVENTION

The present invention has exactly for its object to provide an improved device of the above type, permitting in a simple and effective and inexpensive manner to overcome these drawbacks and to permit providing suitable freezing for various products, particularly food products, with thin layers of liquefied gas.

To do this, according to one characteristics of the invention, the bottom wall of the vibrating trough has a pattern of alternating projecting and hollow portions.

According to more particular characteristics of the invention:

the projecting portions form a regular pattern and preferably fit together continuously with the hollow portions;

relative to the hollow portions, the height of the projecting portions is less than the thickness of the liquefied gas layer, and typically does not exceed half the thickness of this latter.

BRIEF DESCRIPTION OF THE DRAWINGS

Other characteristics and advantages of the present invention will become apparent from the following description of one embodiment, given by way of non-limiting illustration, with respect to the attached drawings, in which.

DETAILED DESCRIPTION OF THE INVENTION

Figure 1:
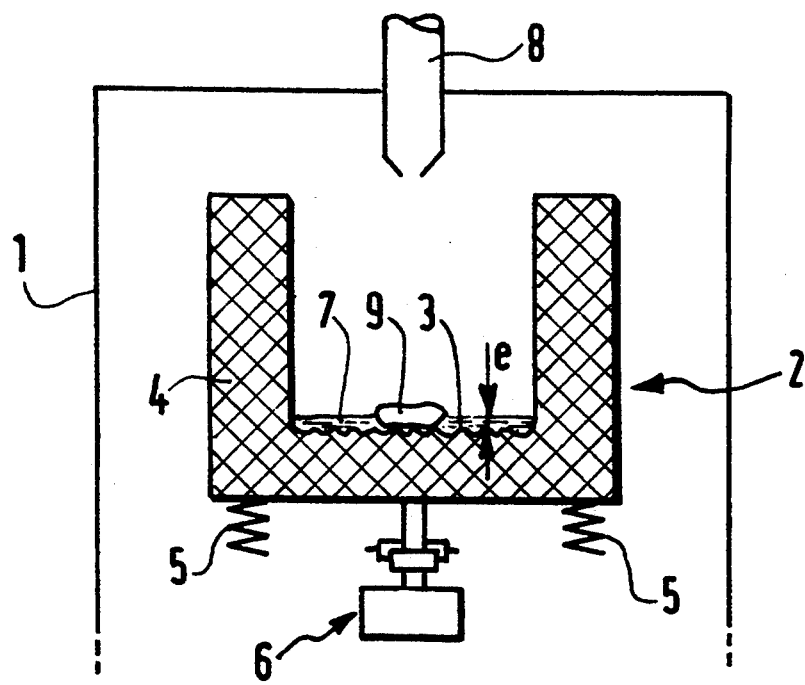
FIG. 1 is a schematic view in transverse cross section of a freezing device with vibrating trough according to the invention.
Figure 2:
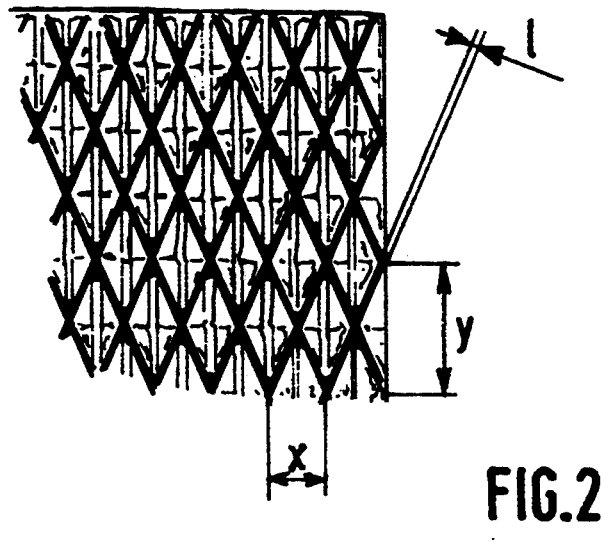
FIGS. 2 and 3 are fragmentary views respectively from above and in transverse cross section of one embodiment of the bottom wall of the vibrating trough according to the invention.

In FIG. 1, there will be seen a freezing device of the type according to the document FR-A-2.674.320 mentioned above, comprising, in an insulated chamber 1, a vibrating trough 2, in the form of a U-shaped trough, comprising particularly a substantially horizontal bottom wall 3 disposed on an insulating structure 4 rigidifying the trough, the assembly being mounted on resilient supports 5 and subjected to vibratory movements of low frequency by a vibration generator 6 of the electric motor or hydraulic jack type. On the bottom 3 of the vibrating trough 2 is formed a layer 7 of liquefied gas, typically liquid nitrogen, maintained by pouring liquid from a spout 8. At a loading end of the trough 2 are disposed, on the bottom 3 covered by the liquid layer 7, articles 9 which are moved toward the opposite end of the trough under the influence of vibrations imparted to this latter while being subjected to strong cooling along the length of the path by contact with the liquefied gas 7.

Figure 3:

According to the invention, at least the bottom 3 of trough 2 is formed to have an alternating pattern, preferably regular, of projecting parts and hollow parts, the height h (FIG. 3) of the projecting parts, relative to the hollow parts, being always less than the thickness e of the layer of liquefied gas, typically less than half, preferably a third of this thickness e, so as to permit normally covering of these projecting parts by the liquefied gas and permitting permanent circulation of liquefied gas in the hollow parts no matter what the shape of the surfaces and the dimensions of the products to be frozen moved along the trough. Preferably, the hollow parts communicate with each other to avoid the formation of isolated pockets of liquid.

The hollow parts and projecting parts are shaped so as to connect continuously, which is to say without edges or tangential discontinuities, with each other, to facilitate cleaning, which is frequent in the field of food preparation.

In the particular embodiment shown in the drawings, the bottom wall, as well as preferably the assembly of the internal surfaces of the trough 2, is formed from an embossed sheet of stainless steel for food use, of a thickness 1.3 mm having an alternating pattern of lozenges of large dimensions y of 9 mm, and small dimensions x of 4.5 mm, a height h of 1.5 mm (for a liquid layer of thickness e greater than 3 mm) and leaving between them flow channels of a width l equal to 1 mm.

Although the present invention has been described in relation to particular embodiments, it is not thereby limited but is on the contrary susceptible to modifications and variations covered by the accompanying claims and which will be apparent to one skilled in the art. In particular, the shape of the path defined by the vibrating trough could be rectilinear, curved or circular. According to this shape, the bottom of the trough could also have a ribbed or grooved configuration, in the direction of advance of the products, the ribs being regularly interrupted to permit circulation of liquid.

What is claimed is:

1. An apparatus for freezing products comprising:
   a transfer structure having at least one transfer surface, said transfer surface having an alternating pattern of projecting and hollow parts;
   means for loading products to be frozen onto the transfer surface;
   dispensing means for dispensing a freezing liquefied gas onto the transfer surface to form a layer of liquefied gas onto the transfer surface; and
   vibrating means coupled to the transfer structure for causing the transfer structure to vibrate and the products on the transfer surface to move along the transfer surface while supported on the projecting parts and in contact with the liquefied gas filling the hollow parts.

2. The apparatus of claim 1, wherein each of said projecting parts smoothly separates at least two adjacent hollow parts.

3. The apparatus of claim 1, wherein the projecting and hollow parts are integral with the transfer structure.

4. The apparatus of claim 3, wherein the transfer structure is constituted of an embossed metal sheet.

5. The apparatus of claim 1, wherein the metal sheet is made of stainless steel.

6. The apparatus of claim 1, wherein the transfer structure is substantially U-shaped in cross section and has a bottom wall which forms the transfer surface.

7. The apparatus of claim 6, wherein the transfer surface is disposed on an insulating material.

8. The apparatus of claim 1, wherein the transfer surface is metallic and the level of liquefied gas is sufficiently high so as to communicate between the hollow parts.

* * * * *